(12) United States Patent
Ali et al.

(10) Patent No.: US 12,061,255 B2
(45) Date of Patent: Aug. 13, 2024

(54) SCAN MATCHING AND RADAR POSE ESTIMATOR FOR AN AUTONOMOUS VEHICLE BASED ON HYPER-LOCAL SUBMAPS

(71) Applicant: GM Global Technology Operations LLC, Detroit, MI (US)

(72) Inventors: Kamran Ali, Troy, MI (US); Wende Zhang, Birmingham, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 17/511,942

(22) Filed: Oct. 27, 2021

(65) Prior Publication Data

US 2023/0126333 A1    Apr. 27, 2023

(51) Int. Cl.
| | |
|---|---|
| *G01S 13/931* | (2020.01) |
| *B60W 50/00* | (2006.01) |
| *B60W 60/00* | (2020.01) |
| *G01S 13/89* | (2006.01) |

(52) U.S. Cl.
CPC ........... *G01S 13/931* (2013.01); *B60W 50/00* (2013.01); *B60W 60/001* (2020.02); *G01S 13/89* (2013.01); *B60W 2050/0088* (2013.01); *B60W 2420/408* (2024.01)

(58) Field of Classification Search
None
See application file for complete search history.

(56) References Cited

U.S. PATENT DOCUMENTS

| | | | |
|---|---|---|---|
| 2017/0300759 A1 | 10/2017 | Beard et al. | |
| 2019/0266748 A1* | 8/2019 | Ahmad | G05D 1/0246 |
| 2020/0150677 A1 | 5/2020 | Walters et al. | |
| 2020/0226790 A1 | 7/2020 | Alvarez et al. | |

(Continued)

FOREIGN PATENT DOCUMENTS

| | | | |
|---|---|---|---|
| CN | 103150747 A | * | 6/2013 |
| CN | 112526513 A | | 3/2021 |

OTHER PUBLICATIONS

Haarbach, Adrian. Multiview ICP, Aug. 2015, pp. 1-9.

(Continued)

*Primary Examiner* — Todd Melton
*Assistant Examiner* — Jason R Roberson
(74) *Attorney, Agent, or Firm* — Vivacqua Crane, PLLC

(57) ABSTRACT

A scan matching and radar pose estimator for determining a final radar pose for an autonomous vehicle includes an automated driving controller that is instructed to determine a hyper-local submap based on a predefined number of consecutive aggregated filtered data point cloud scans and associated pose estimates. The automated driving controller determines an initial estimated pose by aligning a latest aggregated filtered data point cloud scan with the most recent hyper-local submap based on an iterative closest point (ICP) alignment algorithm. The automated driving controller determines a pose graph based on the most recent hyper-local submap and neighboring radar point cloud scans, and executes a multi-view non-linear ICP algorithm to adjust initial estimated poses corresponding to the neighboring radar point cloud scans in a moving window fashion to determine a locally adjusted pose.

20 Claims, 4 Drawing Sheets

(56) References Cited

U.S. PATENT DOCUMENTS

| | | |
|---|---|---|
| 2021/0031795 A1 | 2/2021 | Bariant et al. |
| 2021/0063560 A1 | 3/2021 | Bosse |
| 2022/0066544 A1 | 3/2022 | Kwon et al. |
| 2022/0153276 A1 | 5/2022 | Steyer et al. |
| 2022/0205786 A1* | 6/2022 | Liu .................... G01C 21/1652 |
| 2022/0300745 A1* | 9/2022 | Yang ..................... G06V 10/80 |
| 2022/0319050 A1 | 10/2022 | Mu et al. |

OTHER PUBLICATIONS

Schneider, et al. Odometry-based Online Extrinsic Sensor Calibration, RSJ International Conference on Intelligent Robots and Systems (IROS), Nov. 2013, pp. 1287-1292, IEEE, Tokyo, Japan.

Fantoni, et al. Accurate and automatic alignment of range surfaces, Oct. 2012, pp. 1-8, Department of Computer Science—University of Verona, Italy.

Andreff, et al. On-line Hand-Eye Calibration, 2nd International Conference on 3-D Digital Imaging and Modeling, Oct. 1999, pp. 430-436, National Research Council of Canada, Ottawa, Canada.

He, et al. M2DP: A Novel 3D Point Cloud Descriptor and Its Application in Loop Closure Detection, Oct. 2016, pp. 1-7.

Tsai, et al. A New Technique for Fully Autonomous and Efficient 3D Robotics Hand/Eye Calibration, IEEE Transactions on Robotics and Automation, Jun. 1989, pp. 345-358, vol. 5, No. 3 IEEE.

Furrer, et al. Evaluation of Combined Time-Offset Estimation and Hand-Eye Calibration on Robotic Datasets, Sep. 2017, pp. 1-15, Zurich, Switzerland.

Kellner, Dominik. Instantaneous Ego-Motion Estimation using Multiple Doppler Radars, May 2015, pp. 1-7.

Markley, et al. Averaging Quaternions, Journal of Guidance, Control, and Dynamics, Jul. 2007, pp. 1-11.

Anderson, et al. RANSAC for Motion-Distorted 3D Visual Sensors, RSJ International Conference on Intelligent Robots and Systems (IROS), Nov. 2013, pp. 2093-2099, IEEE, Tokyo, Japan.

* cited by examiner

SCAN MATCHING AND RADAR POSE ESTIMATOR FOR AN AUTONOMOUS VEHICLE BASED ON HYPER-LOCAL SUBMAPS

INTRODUCTION

The present disclosure relates to a system and method for a scan matching and radar pose estimator for an autonomous vehicle based on hyper-local submaps, where the hyper-local submaps are based on a predefined number of consecutive aggregated filtered data point cloud scans and their latest associated pose estimates.

An autonomous vehicle may drive from a starting point to a predetermined destination with limited or no human intervention using various in-vehicle technologies and sensors. Autonomous vehicles include a variety of autonomous sensors such as, but not limited to, cameras, radars, LiDAR, global positioning systems (GPS), and inertial measurement units (IMU) for detecting a vehicle's exterior surroundings and status. However, if a camera or radar is moved from its mounting when the autonomous vehicle is repaired, undergoes an accident, or experiences a significant pothole or obstruction while driving, then the camera or radar sensor needs to be recalibrated, which is a manual and often cumbersome process. Furthermore, if the autonomous vehicle undergoes a wheel alignment, then the cameras and radars also require recalibration. This is because the wheels of the vehicle determine the direction of travel, which affects the aiming of the cameras and radars.

Millimeter wave (mmWave) radar is one specific technology that may be used with autonomous vehicles. For example, millimeter wave radar may be used to warn of forward collisions and backward collisions, to implement adaptive cruise control and autonomous parking, and to perform autonomous driving on streets and highways. It is to be appreciated that millimeter wave radar has advantages over other sensor systems in that millimeter wave radar may work under most types of weather and in light and darkness. A millimeter wave radar may measure the range, angle, and Doppler (radial velocity) of moving objects. A radar point cloud may be determined based on the data collected by the millimeter wave radar based on various clustering and tracking algorithms, which may be used to determine location, velocity, and trajectory of objects. However, radar point clouds based on data collected by millimeter wave radars, and in particular low-cost signal system on chip (SoC) based millimeter wave radars, may be too noisy and sparse to be used for robust and accurate pose estimation required for dynamic calibration purposes.

Thus, while current radar pose estimation approaches for autonomous vehicles achieve their intended purpose, there is a need in the art for an approach that improves the radar pose estimation for a vehicle.

SUMMARY

According to several aspects, a scan matching and radar pose estimator for determining a final radar pose for an autonomous vehicle is disclosed. The scan matching and radar pose estimator includes an automated driving controller that is instructed to determine a hyper-local submap based on a predefined number of consecutive aggregated filtered data point cloud scans and associated pose estimates. The predefined number of consecutive aggregated filtered data point cloud scans are based on an aggregated filtered data point cloud scan that is determined by data collected by an individual radar sensor mounted to the autonomous vehicle. The automated driving controller is instructed to determine an initial estimated pose by aligning a latest aggregated filtered data point cloud scan with the most recent hyper-local submap based on an iterative closest point (ICP) alignment algorithm. The automated driving controller is instructed to determine a pose graph based on the most recent hyper-local submap and neighboring radar point cloud scans. The automated driving controller is instructed to execute a multi-view non-linear ICP algorithm to adjust initial estimated poses corresponding to the neighboring radar point cloud scans in a moving window fashion to determine a locally adjusted pose. The locally adjusted pose is the final radar pose.

In an aspect, the automated driving controller executes instructions to execute a loop detection algorithm to detect the autonomous vehicle is currently situated in a previously visited location, where a loop is detected when the autonomous vehicle is currently in the previously visited location.

In another aspect, in response to detecting the loop, the automated driving controller is instructed to execute a non-linear optimization routine to perform a global pose adjustment to a loop-closure pose graph to determine a loop-adjusted radar pose, and set the loop-adjusted radar pose as the final radar pose.

In yet another aspect, the most recent hyper-local submap is a fixed constraint and the neighboring radar point cloud scans are adjusted with respect to one another as well as with respect the most recent hyper-local submap.

In an aspect, an edge constraint is determined between each neighboring radar point scan.

In another aspect, an edge constraint is determined between each of the neighboring radar point cloud scans and the most recent hyper-local submap.

In yet another aspect, the automated driving controller determines the initial estimated pose by adjusting a maximum distance threshold parameter of the ICP alignment algorithm to determine correspondences between the aggregated filtered data point cloud scans and a point located on the most recent hyper-local submap.

In an aspect, the predefined number of the aggregated filtered data point cloud scans and the associated pose estimates depends upon a sampling rate of the individual radar sensor.

In another aspect, the initial estimated pose is used instead the associated pose estimates that are based on the predefined number of consecutive aggregated filtered data point cloud scans to determine the hyper-local submap.

In yet another aspect, the locally adjusted pose is used instead the associated pose estimates that are based on the predefined number of consecutive aggregated filtered data point cloud scans to determine the hyper-local submap.

In an aspect, the automated driving controller is instructed to determine the predicted pose by determining a relative transform that represents relative motion between a last two consecutive pose estimates associated with the aggregated filtered data point cloud scans, and converting the relative transform between the last two consecutive pose estimate into velocity based on a time difference between the last two consecutive pose estimates associated with the aggregated filtered data point cloud scans, and converting the relative transform from velocity into position based on a time difference between a last pose estimate and a current pose estimate. A difference in position between the last pose estimate and the current pose estimate is the predicted pose.

In an aspect, a method for determining a final radar pose for an autonomous vehicle. The method includes determining a hyper-local submap based on a predefined number of consecutive aggregated filtered data point cloud scans and associated pose estimates. The predefined number of consecutive aggregated filtered data point cloud scans are based on an aggregated filtered data point cloud scan, and the aggregated filtered data point cloud scan is determined based on data collected by an individual radar sensor mounted to the autonomous vehicle. The method includes determining an initial estimated pose by aligning a latest aggregated filtered data point cloud scan with the most recent hyper-local submap based on an ICP alignment algorithm. The method also includes determining a pose graph based on the most recent hyper-local submap and neighboring radar point cloud scans. Finally, the method includes executing a multi-view non-linear ICP algorithm to adjust initial estimated poses corresponding to the neighboring radar point cloud scans in a moving window fashion to determine a locally adjusted pose, where the locally adjusted pose is the final radar pose.

In another aspect, the method includes executing a loop detection algorithm to detect the autonomous vehicle is currently situated in a previously visited location, where a loop is detected when the autonomous vehicle is currently in the previously visited location.

In yet another aspect, in response to detecting the loop, the method includes executing a non-linear optimization routine to perform a global pose adjustment to a loop-closure pose graph to determine a loop-adjusted radar pose, and setting the loop-adjusted radar pose as the final radar pose.

In an aspect, the method includes determining an edge constraint between each neighboring radar point scan.

In another aspect, the method includes determining an edge constraint between each of the neighboring radar point cloud scans and the most recent hyper-local submap.

In yet another aspect, the method includes determining the initial estimated pose by adjusting a maximum distance threshold parameter of the ICP alignment algorithm to determine correspondences between the aggregated filtered data point cloud scans and a point located on the most recent hyper-local submap.

In an aspect, the method includes using the initial estimated pose instead the associated pose estimates that are based on the predefined number of consecutive aggregated filtered data point cloud scans to determine the hyper-local submap.

In another aspect, the method includes using the locally adjusted pose instead the associated pose estimates that are based on the predefined number of consecutive aggregated filtered data point cloud scans to determine the hyper-local submap.

In another aspect, a scan matching and radar pose estimator for determining a final radar pose for an autonomous vehicle is disclosed. The scan matching and radar pose estimator includes an automated driving controller that is instructed to determine a hyper-local submap based on a predefined number of consecutive aggregated filtered data point cloud scans and associated pose estimates. The predefined number of consecutive aggregated filtered data point cloud scans are based on data collected by an individual radar sensor mounted to the autonomous vehicle. The automated driving controller is instructed to determine an initial estimated pose by aligning a latest aggregated filtered data point cloud scan with the most recent hyper-local submap based on an ICP alignment algorithm. The automated driving controller is instructed to determine a pose graph based on the most recent hyper-local submap and neighboring radar point cloud scans. The automated driving controller is instructed to execute a multi-view non-linear ICP algorithm to adjust initial estimated poses corresponding to the neighboring radar point cloud scans in a moving window fashion to determine a locally adjusted pose. The automated driving controller is instructed to execute a loop detection algorithm to detect the autonomous vehicle is currently situated in a previously visited location, where a loop is detected when the autonomous vehicle is currently in the previously visited location. In response to detecting the loop, the automated driving controller executes a non-linear optimization routine to perform a global pose adjustment to a loop-closure pose graph to determine a loop-adjusted radar pose. The automated driving controller is instructed to set the loop-adjusted radar pose as the final radar pose.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
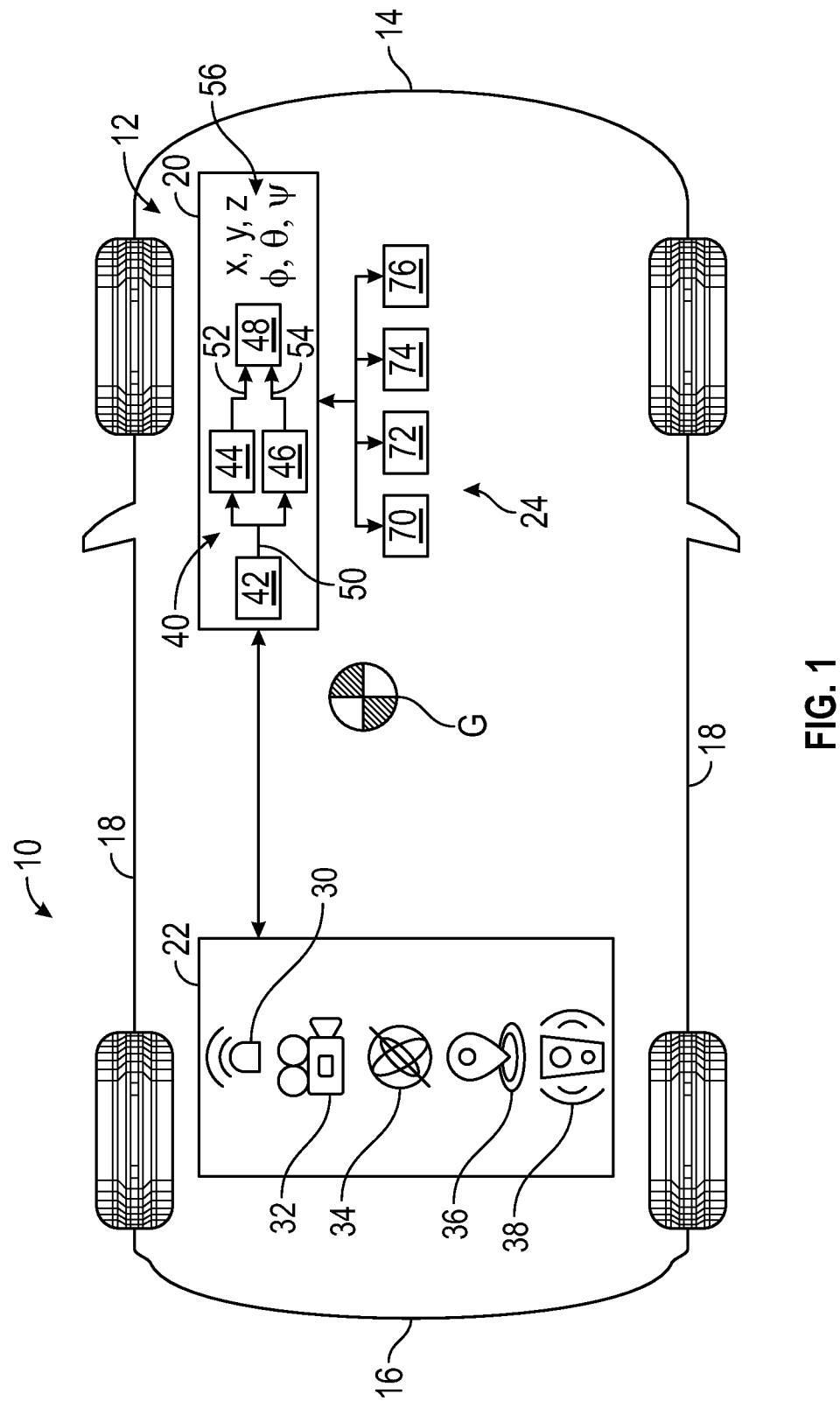
FIG. 1 is a schematic diagram of an autonomous vehicle including a plurality of radar sensors and an automated driving controller, where the automated driving controller includes a pose estimation pipeline for determining calibration coordinates, according to an exemplary embodiment.

Referring to FIG. 1, an exemplary autonomous vehicle 10 is illustrated. The autonomous vehicle 10 has an autonomous driving system 12 that includes an automated driving controller 20 in electronic communication with a plurality of on-board autonomous sensors 22 and a plurality of vehicle systems 24. In the example as shown in FIG. 1, the plurality of on-board autonomous sensors 22 include one or more radar sensors 30, one or more cameras 32, an inertial measurement unit (IMU) 34, a global positioning system (GPS) 36, and LiDAR 38, however, it is to be appreciated that additional sensors may be used as well. The plurality of radar sensors 30 may be mounted to the front 14, the rear 16, and/or the sides 18 of the autonomous vehicle 10 to detect objects in an environment surrounding the autonomous vehicle 10. Each radar sensor 30 performs a plurality of individual scans of the environment surrounding the autonomous vehicle 10 to obtain data in the form of a radar point cloud scan including a plurality of detection points.

The automated driving controller 20 includes a pose estimation pipeline 40 including a scan aggregator and filter 42, an inertial navigation system (INS) module 44, a scan matching and radar pose estimator module 46, and a calibration module 48. As explained below, the scan aggregator and filter 42 determines an aggregated filtered data point cloud scan 50 based on data collected by an individual radar sensor 30 of the environment surrounding the autonomous vehicle 10. The aggregated filtered data point cloud scan 50 sent to the scan matching and radar pose estimator module 46. A timestamp of the scan associated with the aggregated filtered data point cloud scan 50 is sent to the both the INS module 44. The INS module 44 determines IMU poses 52 that are sent to the calibration module 48, and the scan matching and radar pose estimator module 46 determines final radar poses 54 that are sent to the calibration module 48. The calibration module 48 determines six degrees of freedom (6DoF) variables 56 that include x, y, and z coordinates as well as a roll φ, pitch θ, and yaw Ψ of the autonomous vehicle 10. In an embodiment, the six degrees of freedom (6DoF) 56 are radar to vehicle calibration parameters that are employed to automatically align the radar sensors 30 with a center of gravity G of the autonomous vehicle 10. However, it is to be appreciated that the disclosed scan aggregator and filter 42 as well as the scan matching and radar pose estimator module 46 is not limited to 6DoF radar to vehicle calibration parameters and may be used for other applications as well. For example, in another embodiment, the scan aggregator and filter 42 and the scan matching and radar pose estimator module 46 may be used for three-dimensional radar based simultaneous localization and mapping (SLAM) applications.

It is to be appreciated that the radar point clouds obtained by the radar sensors 30 may be sparse, and in some instances include noisy and jittery data, ghost detections, reflections, and clutter. As explained below, even if the radar point clouds are sparse, the disclosed scan matching and radar pose estimator module 46 employs hyper-local submaps for determining the final radar poses 54 with improved accuracy and robustness. Specifically, as explained below, the hyper-local submaps are employed for iterative closest point (ICP) scan matching, multi-view non-linear ICP adjustments, and for pose graph loop-closures, which reduce the effects of sparse radar point clouds.

The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) for performing all driving tasks. Alternatively, in another embodiment, the autonomous vehicle 10 is a semi-autonomous vehicle including an advanced driver assistance system (ADAS) for assisting a driver with steering, braking, and/or accelerating. The automated driving controller 20 determines autonomous driving features such as perception, planning, localization, mapping, and control of the autonomous vehicle 10. Although FIG. 1 illustrates the automated driving controller 20 as a single controller, it is to be appreciated that multiple controllers may be included as well. The plurality of vehicle systems 24 include, but are not limited to, a brake system 70, a steering system 72, a powertrain system 74, and a suspension system 76. The automated driving controller 20 sends vehicle control commands to the plurality of vehicle systems 24 to guide the autonomous vehicle 10.

The radar sensors 30 may be a short range radar for detecting objects from about 1 to about 20 meters from the autonomous vehicle 10, a medium range radar for detecting objects from about 1 to about 60 meters from the autonomous vehicle 10, or a long range radar for detecting objects up to about 260 meters from the autonomous vehicle 10. In one embodiment, the one or more of the radar sensors 30 include millimeter wave (mmWave) radar sensors, and in particular low-cost signal system on chip (SoC) based millimeter wave radar sensors having a limited field-of-view. In another embodiment, the radar sensors 30 include one or more 360 degree rotating radar sensors.

Figure 2:
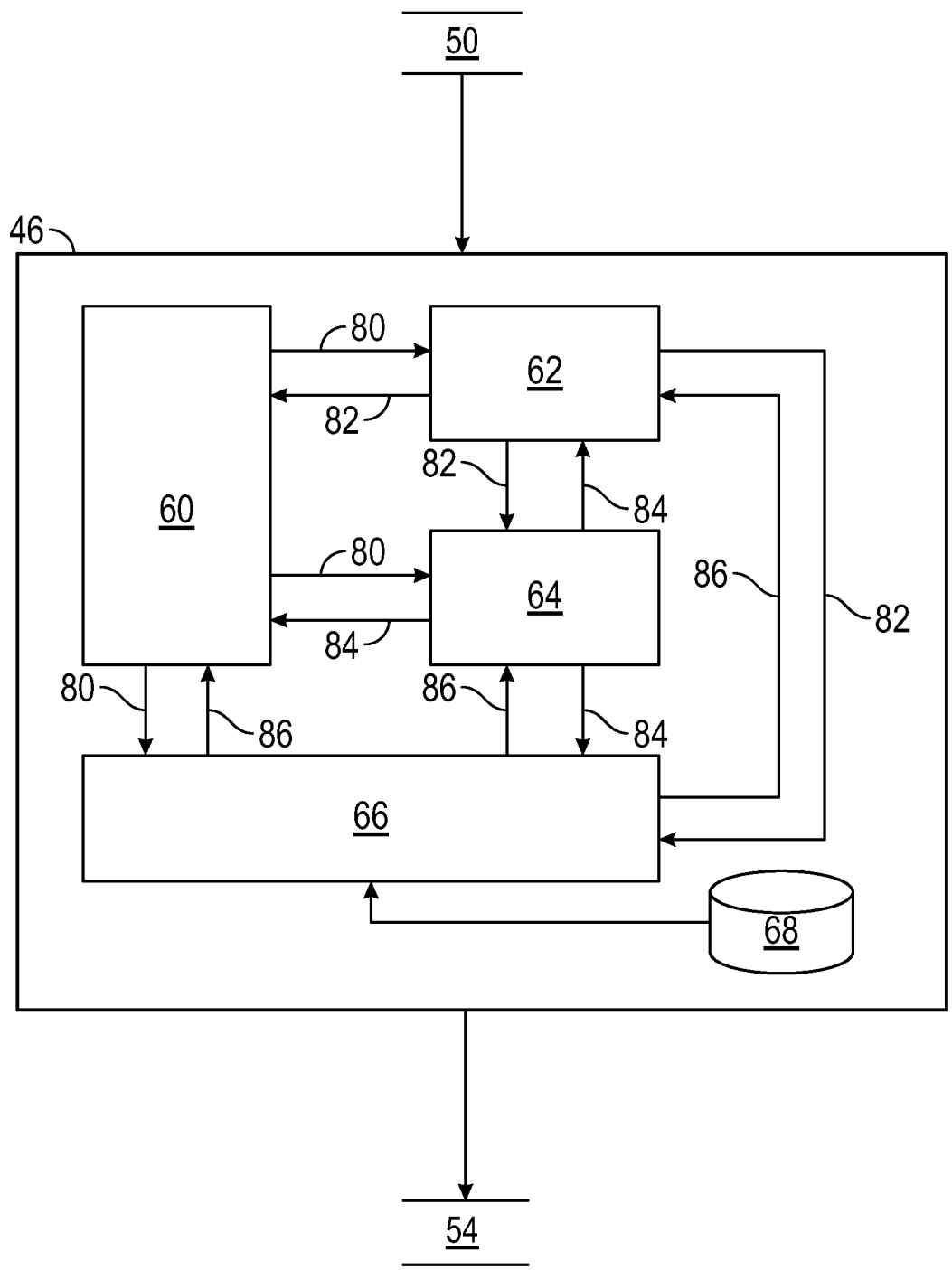
FIG. 2 is a block diagram illustrating a scan matching and radar pose estimator module that is part of the pose estimation pipeline shown in FIG. 1, according to an exemplary embodiment.

Referring now to FIG. 2, a block diagram illustrating the scan matching and radar pose estimator module 46 is shown, where the scan matching and radar pose estimator module 46 includes an iterative closest point (ICP) scan matching sub-module 60, a multi-view non-linear ICP adjustment sub-module 62, a submap sub-module 64, a pose graph loop-closure module 66, and one or more spatial databases 68. The aggregated filtered data point cloud scan 50 from the scan aggregator and filter 42 (seen in FIG. 1) is sent to each of the sub-modules 60, 62, 64, and 66 of the scan matching and radar pose estimator module 46. The ICP scan matching sub-module 60 determines an initial estimated pose 80, which is sent to the remaining sub-modules 62, 64, 66. The multi-view non-linear ICP adjustment sub-module 62 determines an locally adjusted pose 82, which is sent to the remaining sub-modules 60, 64, 66. The submap sub-module 64 determines a hyper-local submap 84, which is sent to the remaining sub-modules 60, 62, 66. Finally, if applicable, the pose graph loop-closure sub-module 66 determines loop-adjusted radar poses 86, which are sent to the remaining sub-modules 60, 62, 64.

Referring to both FIGS. 1 and 2, the final radar poses 54 that are sent to the calibration module 48 are either the locally adjusted poses 82 determined by the multi-view non-linear ICP adjustment sub-module 62 or the loop-adjusted radar poses 86 determined by the pose graph loop-closure module 66. Specifically, in the event a loop-closure is detected by the pose graph loop-closure module 66, then the final radar poses 54 are the loop-adjusted radar poses 86, otherwise, the final radar poses 54 are the locally adjusted poses 82 determined by the multi-view non-linear ICP adjustment sub-module 62. As explained below, locally adjusted poses 82 and the loop-adjusted radar poses 86 are based on the hyper-local submaps 84 determined by the submap sub-module 64. The hyper-local submaps 84 are generally determined based on a predefined number N of consecutive aggregated filtered data point cloud scan 50 and the associated pose estimates, however, in the event the available number of consecutive aggregated filtered data point cloud scans 50 are less than the predefined number N of consecutive aggregated filtered data point cloud scans 50, then the hyper-local submaps 84 may be determined based on the available number of consecutive aggregated filtered data point cloud scans 50 that are presently available.

Referring to FIG. 2, the submap sub-module 64 determines the hyper-local submap 84 based on a predefined number N of consecutive aggregated filtered data point cloud scans 50 and the associated pose estimates, or, in the alternative, if the available number of consecutive aggregated filtered data point cloud scans 50 are less than the predefined number N, then the hyper-local submaps 84 are determined based on the available number of consecutive aggregated filtered data point cloud scans 50 presently available, where the aggregated filtered data point cloud scan 50 is determined based on data collected by an individual radar sensor 30. The submap sub-module 64 initially determines the hyper-local submap 84 based on the predefined number N of the aggregated filtered data point cloud scan 50, which are received from the scan aggregator and filter 42, in combination with the associated pose estimates. Each aggregated filtered data point cloud scan 50 in history is saved in combination with the associated pose estimate. It is to be appreciated that the latest pose estimates received from the one of the sub-modules 60, 62, 66 may be used instead to determine the hyper-local submaps 84. Specifically, the initial estimated pose 80 from the ICP scan matching sub-module 60 takes precedence over the associated pose estimates that are based on the aggregated filtered data point cloud scans 50, the locally adjusted pose 82 determined by the multi-view non-linear ICP adjustment sub-module 62 takes precedence over the initial estimated pose 80, and the loop-adjusted radar poses 86 determined by the pose graph loop-closure sub-module 66 take precedence over the initial estimated pose 80.

The hyper-local submap 84 represents a map constructed of the predetermined number N consecutive aggregated filtered data point cloud scans 50 and the associated pose estimates. The predetermined number N of the aggregated filtered data point cloud scans 50 and the associated pose estimates depends upon a sampling rate of the radar sensor 30 (FIG. 1). In an embodiment, the predetermined number N is one-half the sampling rate of the radar sensor 30. For example, in an embodiment, the sampling rate of the radar sensor 30 is about 20 frames per second (fps), and therefore the predetermined number N is 10.

The ICP scan matching sub-module 60 of the scan matching and radar pose estimator module 46 receives as input a latest aggregated filtered data point cloud scan 50 from the scan aggregator and filter 42 (FIG. 1) and a most recent hyper-local submap 84 from the submap sub-module 64, and determines the initial estimated pose 80 of the latest aggregated filtered data point cloud scan 50. In the event an available number of aggregated filtered data point cloud scans 50 is less than the predetermined number N, then the most recent hyper-local submap 84 may be determined based on the available number of aggregated filtered data point cloud scans 50.

Due to inconsistencies in inter-scan arrival times, it is to be appreciated that directly using a relative pose change between two consecutive scans to predict the initial estimated pose 80 leads to inaccuracies and convergence issues with ICP scan matching. Thus, the ICP scan matching sub-module 60 determines the initial estimated pose 80 by first determining a predicted pose, which is described in greater detail below. It is to be appreciated that the predicted pose is internal to the ICP scan matching sub-module 60. The ICP scan matching sub-module 60 then adjusts a maximum distance threshold parameter of an ICP alignment algorithm to determine correspondences between the aggregated filtered data point cloud scans 50 and the point located on the most recent hyper-local submap 84. It is to be appreciated that the maximum distance threshold is adjusted based on both the linear and angular velocity of the autonomous vehicle 10 (FIG. 1). Finally, the ICP scan matching sub-module 60 determines the initial estimated pose 80, which is used as a starting point to determine the final radar poses 54, by aligning the latest aggregated filtered data point cloud scan 50 with the most recent hyper-local submap 84 based on the ICP alignment algorithm.

In an embodiment, the ICP scan matching sub-module 60 determines the predicted pose by first determining a relative transform that represents relative motion between the last two consecutive pose estimates associated with the latest aggregated filtered data point cloud scans 50. The relative transform between the last two consecutive pose estimates associated with the latest aggregated filtered data point cloud scans 50 is then converted into velocity based on a time difference between the last two consecutive pose estimates associated with the latest radar point scans. Specifically, the relative transform is converted into se(3) space based on a lie algebra log function using the time difference between the last two consecutive pose estimates associated with the latest aggregated filtered data point cloud scans 50. Then, the relative transform is converted from velocity into position based on a time difference between the last pose estimate and a current pose estimate, where a difference in position between the last pose estimate and the current pose estimate is the predicted pose estimate. Specifically, the relative transform is converted into special Euclidian group SE(3) space based on a lie algebra exponential function using the time difference between the last pose estimate and a current pose estimate, and where se(3) is the tangent space of the special Euclidian group SE(3).

Figure 3:
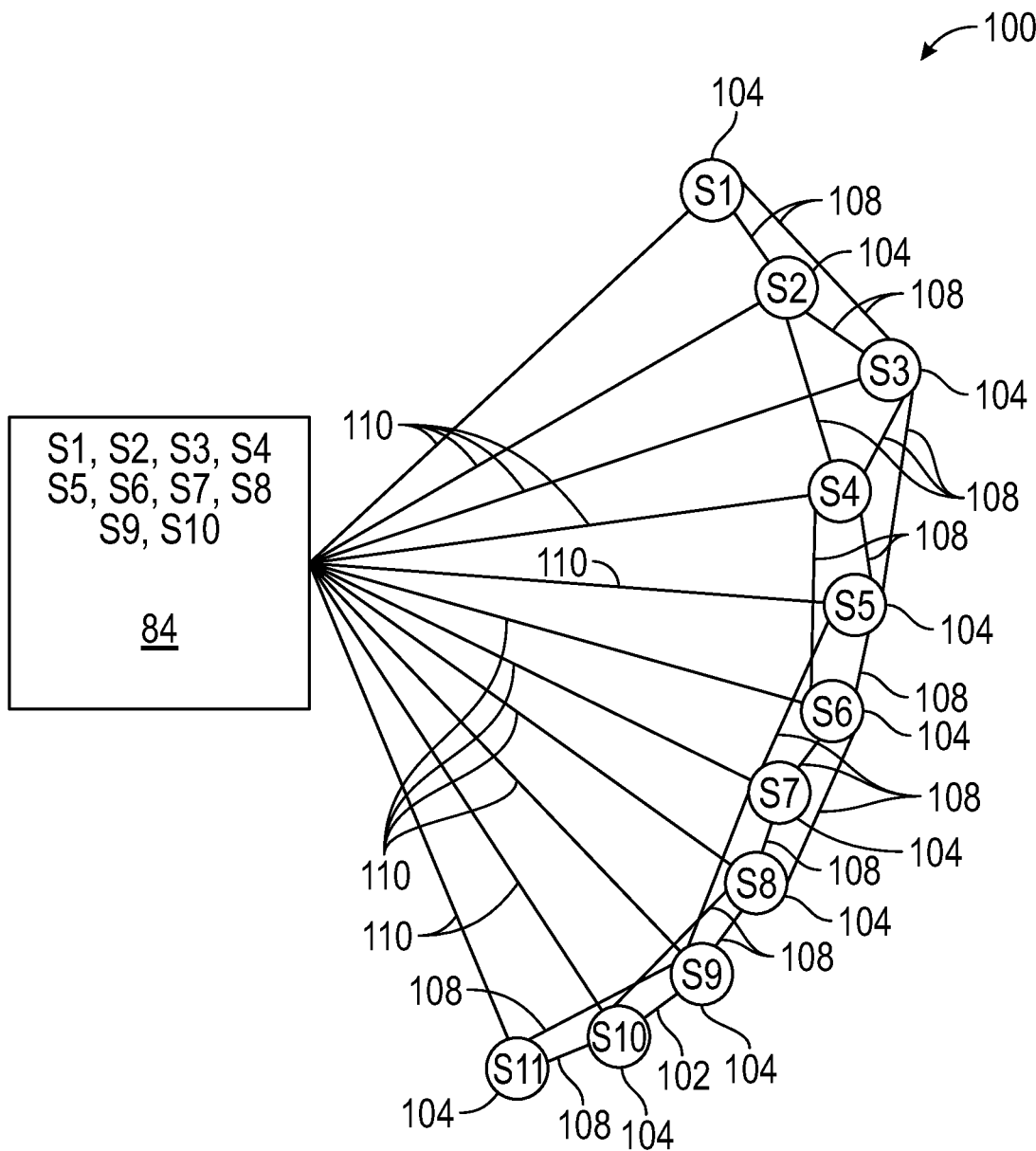
FIG. 3 is a diagram of a pose graph including a fixed hyper-local submap and a plurality of neighboring radar point cloud scans, according to an exemplary embodiment.

Referring to both FIGS. 2 and 3, the multi-view non-linear ICP adjustment sub-module 62 determines a pose graph 100 (seen in FIG. 3) that includes the most recent hyper-local submap 84 and neighboring radar point cloud scans 104. The multi-view non-linear ICP adjustment sub-module 62 aligns the plurality of neighboring radar point cloud scans 104 simultaneously with one another as well as with the most recent hyper-local submap 84. It is to be appreciated that the most recent hyper-local submap 84 is a fixed constraint, however, the neighboring radar point cloud scans 104 are adjusted with respect to one another as well as with respect the most recent hyper-local submap 84.

Referring to FIG. 3, the most recent hyper-local submap 84 is constructed of the predetermined number N consecutive aggregated filtered data point cloud scans 50 and the corresponding initial estimated pose 80 corresponding to a newest point cloud scan S11 determined by the ICP scan matching sub-module 60. It is to be appreciated that the corresponding final radar poses 54 are already saved in memory for the previous radar point cloud scans S1-S10. In the example as shown in FIG. 3, the predetermined number N is ten, and the most recent hyper-local submap 84 includes 10 consecutive point cloud scans, S1-S10. The pose graph 100 also includes an N+1 number of neighboring radar point cloud scans 104. In other words, the pose graph 100 includes one additional neighboring radar point cloud scan 104 when compared to the most recent hyper-local submap 84. In the example as shown in FIG. 3, the pose graph 100 includes neighboring radar point cloud scans S1, S2, S3, S4, S5, S6, S7, S8, S9, S10 and S11, where S11 represents the newest radar point cloud scan from the radar sensor 30 (FIG. 1). It is to be appreciated that a proximity of the neighboring radar point cloud scans 104 is measured based on their corresponding latest pose estimates.

Referring to both FIGS. 2 and 3, the multi-view non-linear ICP adjustment sub-module 62 determines the pose graph 100 by first determining neighboring radar point cloud scans 104 based on their corresponding initial estimated pose 80. The multi-view non-linear ICP adjustment sub-module 62 also determines a proximity between the neighboring radar point cloud scans 104 based on a k-nearest neighbor (kNN) technique. Specifically, the kNN technique may be used to determine a neighborhood or adjacency matrix between the neighboring radar point cloud scans 104.

The multi-view non-linear ICP adjustment sub-module 62 then determines the pose graph 100 by computing point-to-point correspondences for each of the neighboring radar point cloud scans 104 and the most recent hyper-local submap 84 based on a maximum correspondence distance threshold. In one non-limiting embodiment, the maximum correspondence distance threshold is about 1.5 meters, however, it is to be appreciated that the maximum correspondence distance threshold is adjusted based on both the linear and angular velocity of the autonomous vehicle 10 (FIG. 1). The multi-view ICP adjustment sub-module 62 determines edge constraints 108 for connecting the nodes that represent the neighboring radar point cloud scans 104. The edge constraints 108 define a relative pose between the nodes and an uncertainty of the measurement. In the example as shown in FIG. 3, the variable k is equal to 3. Thus, three edge constraints 108 are determined between the respective neighboring radar point scan 104 and one of the remaining neighboring radar point cloud scans 104. An edge constraint 110 is also determined between each of the neighboring radar point cloud scans 104 and the most recent hyper-local submap 84. In other words, the most recent hyper-local submap 84 is the neighbor of each of the neighboring radar point cloud scans 104. The multi-view non-linear ICP adjustment sub-module 62 then assigns a weight for each of the edge constraints 108, 110, where the weight is a measure of distances between various point correspondences found between any two neighboring radar point cloud scans 104, or a neighboring radar point cloud scans 104 and the most recent hyper-local submap 84. In an embodiment, the measure of distances is the average of a median of all the corresponding distances and a maximum correspondence distance. It is to be appreciated that the most recent hyper-local submap is a point cloud comprising of multiple scans.

Once the pose graph 100 is constructed, the multi-view non-linear ICP adjustment sub-module 62 executes a multi-view non-linear ICP algorithm to adjust the initial estimated poses 80 that correspond to the neighboring radar point cloud scans 104 in a moving window fashion to determine the locally adjusted pose 82. It is to be appreciated that the moving window is a global window that moves over N+1 latest scans (including the latest scan) and is incremented by a single radar point cloud scan 104 each time a new scan is introduced. One example of a multi-view non-linear ICP algorithm that may be used is Levenberg-Marquardt ICP, however, it is to be appreciated that other approaches may be used as well. Once the multi-view non-linear ICP adjustment sub-module 62 executes a multi-view non-linear ICP algorithm to adjust the initial estimated poses 80 corresponding to the neighboring radar point cloud scans 104, only the initial estimated pose 80 associated with the oldest scan S1 of the N+1 scans is finalized and saved as its locally adjusted pose. It is to be appreciated that the oldest scan S1 is skipped during the next moving window of the multi-view non-linear ICP algorithm.

Referring back to FIG. 2, the pose graph loop-closure sub-module 66 of the scan matching and radar pose estimator module 46 determines loop-adjusted radar poses 86 by first executing a loop detection algorithm to detect whether the autonomous vehicle 10 (FIG. 1) is currently in a location that has previously been visited. When the autonomous vehicle 10 is currently in a location that has previously been visited, this is referred to as detecting a loop. In response to detecting a loop, the pose graph loop-closure sub-module 66 executes a non-linear optimization routine to determine the loop-adjusted radar poses 86. One example of a non-linear optimization routine for determining the loop-adjusted radar poses 86 is a non-linear least-squares routine such as, but not limited to, the Levenberg-Marquardt algorithm.

As seen in FIG. 2, the pose graph loop-closure sub-module 66 is in communication with the one or more spatial databases 68. As the autonomous vehicle 10 (FIG. 1) travels, the pose graph loop-closure sub-module 66 determines two-dimensional feature descriptors of the hyper-local submaps 84 determined by the submap sub-module 64, which are stored within the one or more spatial databases 68. For example, multi-view two-dimensional projection (M2DP) feature descriptors of the hyper-local submaps 84 are stored in the one or more spatial databases 68. One example of a spatial database 68 that may be used is a k-d tree, which is a space-partitioning data structure for organizing points in a k-dimensional space. In embodiments, the two-dimensional feature descriptors of only preselected or key hyper-local submaps 84 may be stored within the one or more spatial databases 68, where a key spatial database 68 is defined based on a threshold amount of motion that occurs between consecutive hyper-local submaps 84.

As the autonomous vehicle 10 (FIG. 1) travels, the ICP scan matching sub-module 60 receives a latest data point cloud scan from the scan aggregator and filter 42 (FIG. 1). As the ICP scan matching sub-module 60 processes the latest data point cloud scan, the pose graph loop-closure sub-module 66 determines the two-dimensional feature descriptors of the hyper-local submaps 84 corresponding to the latest filtered data point cloud scan 50, and finds matching two-dimensional feature descriptors stored within the one or more spatial databases 68. In response to determining the matching two-dimensional feature descriptors stored within the one or more spatial databases 68 is within a prespecified threshold, then a loop-closure ICP scan matching algorithm is performed. When trying to find a match, the closest match among all candidate matches within the one or more spatial databases 68 within the prespecified threshold is chosen. Specifically, the loop-closure ICP scan matching algorithm is performed between the latest data point cloud scan and a scan that corresponds to the matching two-dimensional feature descriptors stored within the one or more spatial databases 68 based on a relaxed correspondence distance threshold. The prespecified threshold is empirically determined and in one embodiment is 0.35 (the specified threshold is unitless) when M2DP is employed. The relaxed correspondence distance threshold is also determined empirically and depends upon the configuration. In an embodiment, the relaxed correspondence distance threshold is about five meters.

In response to determining a loop closing overlap score and a root-mean-squared error (RMSE) fall within a pre-defined threshold, the latest radar point cloud scan and a corresponding loop closing transform are added to a loop-closure pose graph. In an embodiment, the loop closing overlap score is at least 0.75 (at least a 75% overlap) and the RMSE is about 3 meters. The loop-closure pose graph that is constructed by the pose graph loop-closure sub-module 66 is constructed of aggregated filtered data point scans 50 and their associated poses, and the edge constraints of the loop-closure pose graph are based on relative motion constraints. The pose graph loop-closure sub-module 66 executes a non-linear optimization routine to perform a global pose adjustment to the loop-closure pose graph to determine the loop-adjusted radar poses 86. As mentioned above, one example of a non-linear optimization routine for determining the loop-adjusted radar poses 86 is a non-linear least-squares routine such as, but not limited to, the Levenberg-Marquardt algorithm.

Figure 4:
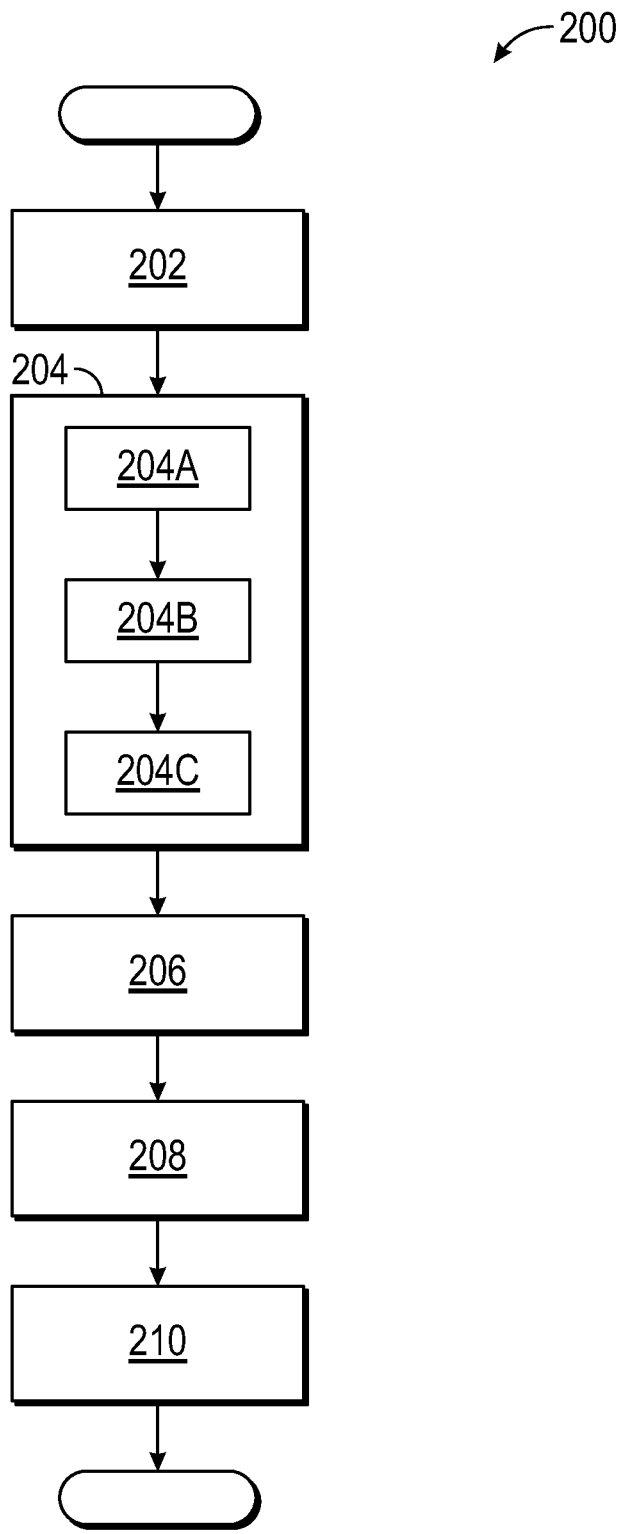
FIG. 4 is a process flow diagram illustrating a method for determining final radar poses by the scan matching and radar pose estimator module 46 shown in FIG. 2, according to an exemplary embodiment.

FIG. 4 is a process flow diagram illustrating a method 200 for determining the final radar poses 54 (FIG. 2) by the scan matching and radar pose estimator module 46 (FIG. 2). Referring generally to FIGS. 1-4, the method 200 begins at block 202. In block 202, the submap sub-module 64 of the radar pose estimator module 46 initially determines the hyper-local submap 84 based on the predefined number N of the aggregated filtered data point cloud scans 50, which are received from the scan aggregator and filter 42, in combination with the associated pose estimates. In the alternative, if the available number of consecutive aggregated filtered data point cloud scans 50 are less than the predefined number N, then the hyper-local submaps 84 are determined based on the available number of consecutive aggregated filtered data point cloud scans 50 presently available. As mentioned above, the submap sub-module 64 initially determines the hyper-local submap 84 based on the predefined number N of the aggregated filtered data point cloud scans 50 and the associated pose estimates, which are received from the scan aggregator and filter 42, however, is to be appreciated that the submap sub-module 64 utilizes the latest pose estimates received from the one of the sub-modules 60, 62, 66. The method 200 may then proceed to block 204.

In block 204, the ICP scan matching sub-module 60 of the scan matching and radar pose estimator module 46 determines the initial estimated pose 80 by aligning the latest aggregated filtered data point cloud scan 50 with the most recent hyper-local submap 84 based on the ICP alignment algorithm. Specifically, the ICP scan matching sub-module 60 determines the predicted pose as outlined in sub-blocks 204A-204C.

In block 204A, the ICP scan matching sub-module 60 determines the relative transform that represents relative motion between the last two consecutive pose estimates associated with the latest aggregated filtered data point cloud scans 50. The method 200 may then proceed to sub-block 204B. In sub-block 204B, the relative transform between the last two consecutive pose estimates associated with the latest aggregated filtered data point cloud scans 50 is then converted into velocity based on a time difference between the last two consecutive pose estimates associated with the latest radar point scans. In block 204C, the relative transform is converted from velocity into position based on a time difference between the last pose estimate and a current pose estimate, where a difference in position between the last pose estimate and the current pose estimate is the predicted pose. The method 200 may then proceed to block 206.

In block 206, the multi-view non-linear ICP adjustment sub-module 62 determines the locally adjusted pose 82 by first determining the pose graph 100 (seen in FIG. 3) based on the most recent hyper-local submap 84 and neighboring radar point cloud scans 104, and then executes a multi-view non-linear ICP algorithm to adjust the initial estimated poses 80 that correspond to the neighboring radar point cloud scans 104 in a moving window fashion to determine the locally adjusted pose 82. In an embodiment, a loop-closure is not detected by the pose graph loop-closure module 66. Accordingly, the final radar pose 54 is the locally adjusted pose 82. The method 200 may then terminate or return to block 202. However, in the event a loop-closure is detected by the pose graph loop-closure module 66, the method 200 may proceed to block 208.

In block 208, the pose graph loop-closure sub-module 66 executes the loop detection algorithm to detect whether the autonomous vehicle 10 is currently situated in a previously visited location. As mentioned above, a loop is detected when the autonomous vehicle 10 is currently in the previously visited location. The method 200 may then proceed to block 210.

In block 210, in response to detecting a loop, the pose graph loop-closure sub-module 66 executes the non-linear optimization routine to perform a global pose adjustment to the loop-closure pose graph to determine the loop-adjusted radar poses 86. As mentioned above, one example of a non-linear optimization routine for determining the loop-adjusted radar poses 86 is a non-linear least-squares routine such as, but not limited to, the Levenberg-Marquardt algorithm. It is to be appreciated that the final radar poses 54 are the loop-adjusted radar poses 86. The method 200 may then terminate.

Referring generally to the figures, the disclosed scan matching and radar pose estimator for the autonomous vehicle provides various technical effects and benefits. Specifically, the disclosure provides if the radar point clouds collected by the autonomous vehicle's radar sensors are sparse, the disclosed scan matching and radar pose estimator module employs hyper-local submaps for determining final radar poses with enhanced accuracy. Specifically, the disclosed scan matching and radar pose estimator employs the hyper-local submaps, which reduce the effects of sparse radar point clouds.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A scan matching and radar pose estimator for determining a final radar pose for an autonomous vehicle, the scan matching and radar pose estimator comprising:
   an automated driving controller that is instructed to:
      determine a hyper-local submap based on a predefined number of consecutive aggregated filtered data point cloud scans and their associated pose estimates, wherein the predefined number of consecutive aggregated filtered data point cloud scans are determined based on an aggregated filtered data point cloud scan that is determined from data collected by an individual radar sensor mounted to the autonomous vehicle, and wherein the hyper-local submap represents a map constructed of the predefined number of consecutive aggregated data point cloud scans and the associated pose estimates;
      determine an initial estimated pose of a latest aggregated filtered data point cloud scan by aligning a latest aggregated filtered data point cloud scan with a most recent hyper-local submap from the automated driving controller based on an iterative closest point (ICP) alignment algorithm;
      determine a pose graph based on the most recent hyper-local submap and neighboring radar point cloud scans, wherein the pose graph includes one additional neighboring radar point cloud scan when compared to a number of hyper-local submaps saved in the automated driving controller;

execute a multi-view non-linear ICP algorithm to adjust initial estimated poses corresponding to the neighboring radar point cloud scans in a moving window fashion to determine a locally adjusted pose, wherein the locally adjusted pose is a final radar pose;

calculate a plurality of radar to vehicle calibration parameters for automatically aligning the individual radar sensor with a center of gravity of the autonomous vehicle based on the final radar pose; and align the individual radar sensor with the center of gravity of the autonomous vehicle.

2. The scan matching and radar pose estimator of claim 1, wherein the automated driving controller executes instructions to:

execute a loop detection algorithm to detect the autonomous vehicle is currently situated in a previously visited location, wherein a loop is detected when the autonomous vehicle is currently in the previously visited location.

3. The scan matching and radar pose estimator of claim 2, wherein the automated driving controller executes instructions to:

in response to detecting the loop, execute a non-linear optimization routine to perform a global pose adjustment to a loop-closure pose graph to determine a loop-adjusted radar pose, wherein the loop-closure pose graph is constructed of the aggregated filtered data point cloud scans and the associated pose estimates; and set the loop-adjusted radar pose as the final radar pose.

4. The scan matching and radar pose estimator of claim 1, wherein the most recent hyper-local submap is a fixed constraint and the neighboring radar point cloud scans are adjusted with respect to one another as well as with respect the most recent hyper-local submap.

5. The scan matching and radar pose estimator of claim 1, wherein an edge constraint is determined between each neighboring radar point scan.

6. The scan matching and radar pose estimator of claim 1, wherein an edge constraint is determined between each of the neighboring radar point cloud scans and the most recent hyper-local submap.

7. The scan matching and radar pose estimator of claim 1, wherein the automated driving controller determines the initial estimated pose by adjusting a maximum distance threshold parameter of the ICP alignment algorithm to determine correspondences between the aggregated filtered data point cloud scans and a point located on the most recent hyper-local submap.

8. The scan matching and radar pose estimator of claim 1, wherein the predefined number of the aggregated filtered data point cloud scans and the associated pose estimates depends upon a sampling rate of the individual radar sensor.

9. The scan matching and radar pose estimator of claim 1, wherein the initial estimated pose is used instead of the associated pose estimates of the predefined number of consecutive aggregated filtered data point cloud scans to determine the hyper-local submap.

10. The scan matching and radar pose estimator of claim 1, wherein the locally adjusted pose is used instead of the associated pose estimates of the predefined number of consecutive aggregated filtered data point cloud scans to determine the hyper-local submap.

11. The scan matching and radar pose estimator of claim 1, wherein the automated driving controller is instructed to determine the predicted pose by:

determining a relative transform that represents relative motion between a last two consecutive pose estimates associated with the aggregated filtered data point cloud scans converting the relative transform between the last two consecutive pose estimate into velocity based on a time difference between the last two consecutive pose estimates associated with the aggregated filtered data point cloud scans; and converting the relative transform from velocity into position based on a time difference between a last pose estimate and a current pose estimate, wherein a difference in position between the last pose estimate and the current pose estimate is the predicted pose.

12. A method for determining a final radar pose for an autonomous vehicle, the method comprising:

determining a hyper-local submap based on a predefined number of consecutive aggregated filtered data point cloud scans and their associated pose estimates, wherein the predefined number of consecutive aggregated filtered data point cloud scans are determined based on an aggregated filtered data point cloud scan, and the aggregated filtered data point cloud scan is determined based on data collected by an individual radar sensor mounted to the autonomous vehicle, and wherein the hyper-local submap represents a map constructed of the predefined number of consecutive aggregated data point cloud scans and the associated pose estimates;

determining an initial estimated pose of a latest aggregated filtered data point cloud scan by aligning a latest aggregated filtered data point cloud scan with a most recent hyper-local submap from an automated driving controller based on an ICP alignment algorithm;

determining a pose graph based on the most recent hyper-local submap and neighboring radar point cloud scans, wherein the pose graph includes one additional neighboring radar point cloud scan when compared to a number of hyper-local submaps saved in the automated driving controller;

executing a multi-view non-linear ICP algorithm to adjust initial estimated poses corresponding to the neighboring radar point cloud scans in a moving window fashion to determine a locally adjusted pose, wherein the locally adjusted pose is a final radar pose;

calculating a plurality of radar to vehicle calibration parameters for automatically aligning the individual radar sensor with a center of gravity of the autonomous vehicle based on the final radar pose; and aligning the individual radar sensor with the center of gravity of the autonomous vehicle.

13. The method of claim 12, further comprising:

executing a loop detection algorithm to detect the autonomous vehicle is currently situated in a previously visited location, wherein a loop is detected when the autonomous vehicle is currently in the previously visited location.

14. The method of claim 13, further comprising:

in response to detecting the loop, executing a non-linear optimization routine to perform a global pose adjustment to a loop-closure pose graph to determine a loop-adjusted radar pose, wherein the loop-closure pose graph is constructed of the aggregated filtered data point cloud scans and the associated pose estimates; and setting the loop-adjusted radar pose as the final radar pose.

15. The method of claim 12, further comprising:
determining an edge constraint between each neighboring radar point scan.

16. The method of claim 12, further comprising:
determining an edge constraint between each of the neighboring radar point cloud scans and the most recent hyper-local submap.

17. The method of claim 12, further comprising:
determining the initial estimated pose by adjusting a maximum distance threshold parameter of the ICP alignment algorithm to determine correspondences between the aggregated filtered data point cloud scans and a point located on the most recent hyper-local submap.

18. The method of claim 12, further comprising:
using the initial estimated pose instead of the associated pose estimates of the predefined number of consecutive aggregated filtered data point cloud scans to determine the hyper-local submap.

19. The method of claim 12, further comprising:
using the locally adjusted pose instead of the associated pose estimates of the predefined number of consecutive aggregated filtered data point cloud scans to determine the hyper-local submap.

20. A scan matching and radar pose estimator for determining a final radar pose for an autonomous vehicle, the scan matching and radar pose estimator comprising:
an automated driving controller that is instructed to:
determine a hyper-local submap based on a predefined number of consecutive aggregated filtered data point cloud scans and their associated pose estimates, wherein the predefined number of consecutive aggregated filtered data point cloud scans are determined based on data collected from an individual radar sensor mounted to the autonomous vehicle, and wherein the hyper-local submap represents a map constructed of the predefined number of consecutive aggregated data point cloud scans and the associated pose estimates;
determine an initial estimated pose of a latest aggregated filtered data point cloud scan by aligning a latest aggregated filtered data point cloud scan with most recent hyper-local submap from the automated driving controller based on an ICP alignment algorithm;
determine a pose graph based on the most recent hyper-local submap and neighboring radar point cloud scans, wherein the pose graph includes one additional neighboring radar point cloud scan when compared to a number of hyper-local submaps saved in the automated driving controller;
execute a multi-view non-linear ICP algorithm to adjust initial estimated poses corresponding to the neighboring radar point cloud scans in a moving window fashion to determine a locally adjusted pose;
execute a loop detection algorithm to detect the autonomous vehicle is currently situated in a previously visited location, wherein a loop is detected when the autonomous vehicle is currently in the previously visited location;
in response to detecting the loop, executes a non-linear optimization routine to perform a global pose adjustment to a loop-closure pose graph to determine a loop-adjusted radar pose, wherein the loop-closure pose graph is constructed of the aggregated filtered data point cloud scans and the associated pose estimates;
set the loop-adjusted radar pose as a final radar pose;
calculate a plurality of radar to vehicle calibration parameters for automatically aligning the individual radar sensor with a center of gravity of the autonomous vehicle based on the final radar pose; and
align the individual radar sensor with the center of gravity of the autonomous vehicle.

\* \* \* \* \*